G. BRAUN.
COOLING DEVICE FOR EXPLOSIVE ENGINES.
APPLICATION FILED MAY 9, 1904.

914,109.

Patented Mar. 2, 1909.

3 SHEETS—SHEET 1.

WITNESSES
W. M. Avery
Isaac B. Owens.

INVENTOR
Georges Braun
BY
ATTORNEYS.

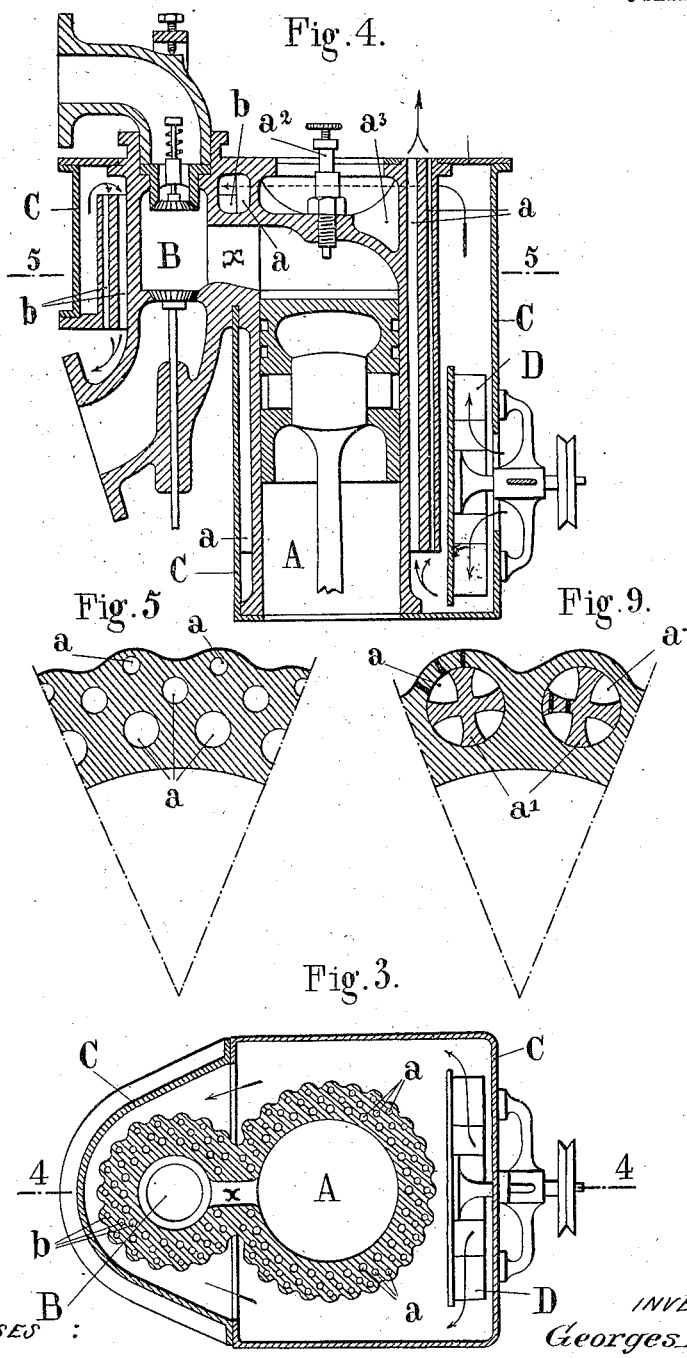

G. BRAUN.
COOLING DEVICE FOR EXPLOSIVE ENGINES.
APPLICATION FILED MAY 9, 1904.

914,109.

Patented Mar. 2, 1909.
3 SHEETS—SHEET 3.

WITNESSES:
W. M. Avery
Isaac B. Owens.

INVENTOR
Georges Braun
BY
ATTORNEYS.

UNITED STATES PATENT OFFICE.

GEORGES BRAUN, OF PARIS, FRANCE.

COOLING DEVICE FOR EXPLOSIVE-ENGINES.

No. 914,109.  Specification of Letters Patent.  Patented March 2, 1909.

Application filed May 9, 1904. Serial No. 206,938.

*To all whom it may concern:*

Be it known that I, GEORGES BRAUN, of 93 Quai de Valmy, in the city of Paris, Republic of France, clerk, have invented a Cooling Device for Explosive - Engines, of which the following is a full, clear, and exact description.

This invention relates to means for cooling the cylinders and valve boxes of explosion engines of all kinds, but more especially and with more advantages in the case of the engines of agricultural and other locomobile machines and of automobile vehicles, and has for its object to provide a very simple, cheap and efficient cooling device for such engines.

Figure 1:
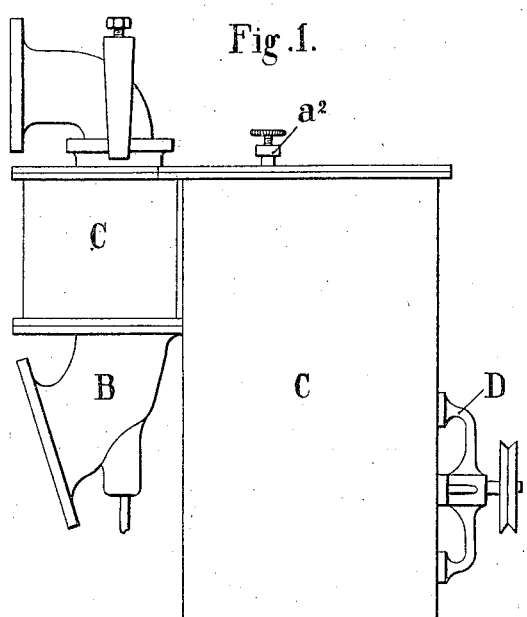
Figure 2:
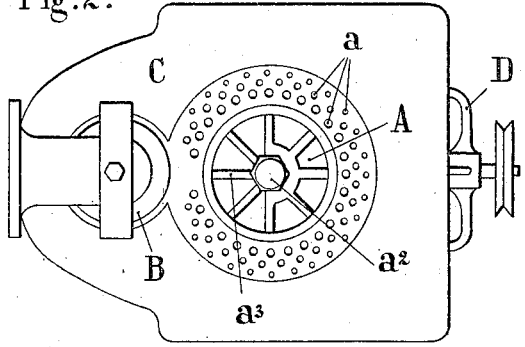
Figure 7:
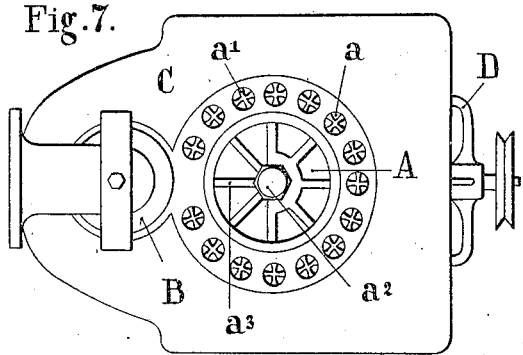
Figure 6:
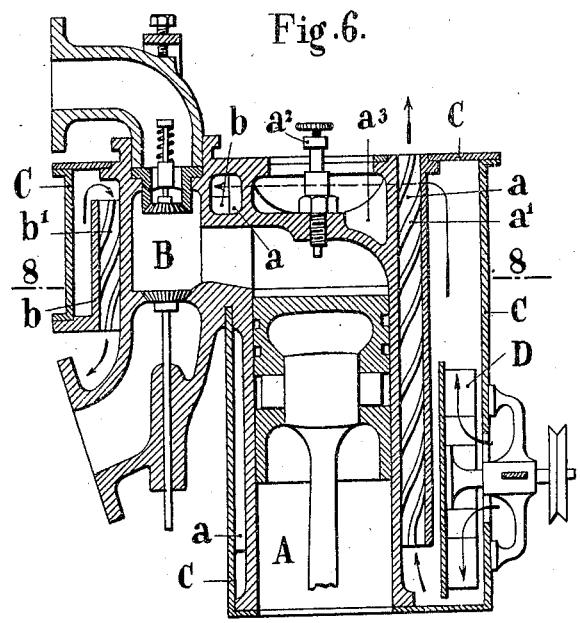
Figure 8:
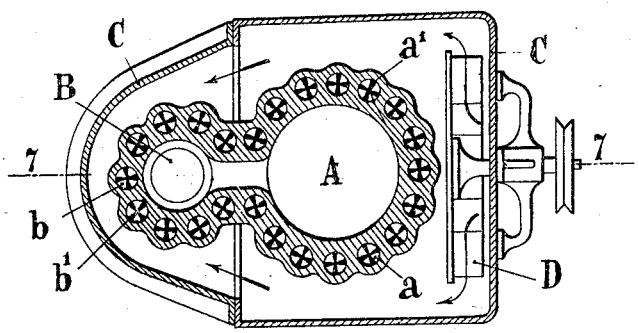

Figure 1 of the annexed drawing is a view in elevation of an apparatus for carrying out the invention. Fig. 2 is a plan view of the same. Fig. 3 is a horizontal section on line 5—5 of Fig. 4. Fig. 4 is a vertical section on line 4—4 of Fig. 3. Fig. 5 is a detail sectional view of the cylinder on an enlarged scale. Fig. 6 is a vertical section on the line 7—7 of Fig. 8, of another form of apparatus for carrying out the invention. Fig. 7 is a plan view of the same. Fig. 8 is a horizontal section on the line 8—8 of Fig. 6, and Fig. 9 is a detail sectional view on an enlarged scale of the cylinder shown in Fig. 6.

Similar letters of reference indicate corresponding parts in all the figures.

Referring to Figs. 1 to 5 of the drawing, the cylinder A and the valve box B are surrounded by two series of lateral cylindrical conduits *a b*, of different diameters and preferably arranged in quincunx form.

The cylinder A and the valve box B are enveloped in a casing C, made of sheet metal, forming a reservoir for equalizing the pressure and in the interior of which is placed a blower D or any similar apparatus, which forces air into the reservoir, and keeps it stored in the said reservoir up to a pressure sufficient to give the said air a very great velocity of discharge. The cylinder A and the valve box B are connected by a channel *x* elongated in direction of the length of the cylinder so that the conduits will not be separated to any great extent and this end of the cylinder prevented from being cooled. The blower D keeps the air in the reservoir, formed by the casing C, under pressure, so that the air passes rapidly and uniformly through the conduits *a b*.

The courses of the arrows in Figs. 3 and 4 show that the air circulates at a very high speed and escapes from the conduits *a* after having run through them from bottom to top, and from the conduits *b* after having run through them from top to bottom, which gives, in each case, a regular circulation. As the explosions take place in the upper part of the cylinder A, being brought about by the igniter *a*, the upper part of said cylinder is the hottest, and as the upper part of the valve box B is cooled by the passage of the intermittent current of carburetted air, the lower part of it is the hottest, because it serves for the escape of the products of combustion. Then again as the conduits *b* are comparatively short the air does not remain long in the said conduits and consequently greatly facilitates the cooling of the valve box B. The circulation of the air under pressure, from the top to the bottom in the said conduits *b*, has also the advantage of preventing the heating of the carbureted air before it reaches the cylinder through the inlet valve, and the expansion of this carbureted air by being heated would diminish the effective weight thereof.

In Figs. 6, 7, 8 and 9, I have shown an apparatus which is cheaper to manufacture, inasmuch as the number of conduits to be bored is considerably reduced. The diameters of the cylindrical conduits *a b* are, in this case equal, and, in the interior of the said conduits *a b*, bars of metal *a' b'* with spiral grooves are fixed. The conduits *a b* are, thus each divided into a series of conduits of smaller available passage, the result of which is to put the air under pressure which passes through them into contact with a greater surface to be cooled, and at the same time a gyrating motion is given to the said air under pressure, which, by its centrifugal effects, compels the molecules of the central part to reach the periphery producing a circulation which is most favorable to the exchange of temperatures.

In this form of the apparatus the cylinder A and the valve box B become so to speak, as in the first form of apparatus, one and the same metallic block without break of continuity from the point of view of conductibility.

In the two forms above described, instead of a blower a suction device may be employed.

In concluding the present explanation, it is well to add that, under the conditions detailed above and as direct experiments have clearly shown, the transmission and the departure of the heat takes place with rapidity and an apparatus of great efficiency is produced.

If desired the cylinder A may be provided with ribs $a^3$, playing the part of winglets which act by radiation and by conductibility. As shown in the detail view in Fig. 5, the conduits $a\ b$ may be of diameters differing from each other in such a way that the conduits nearest to the inner walls of the cylinder A and of the valve box B are of greater diameter than the conduits farthest away from the said walls, the object of this being to make the currents of air of the greatest useful effect pass through the conduits corresponding to the hottest parts. Lastly, it must be clearly understood, on the one hand that the conduits $a\ b$, instead of being bored right in the metal, as has been stated above, might be fitted to the outer contours of the cylinder A and of the valve box B, or formed by tubes, with longitudinal winglets on the inside, placed in the molds, before casting, to the desired number and at the desired places, but always upon the express condition of putting the surfaces of connection into close metallic contact, and, on the other hand, that the fillings $a'\ b'$ might present, in section, any suitable shapes other than those indicated above, it being moreover understood that one may, in general and without in any way changing the nature of the invention, vary at will the forms, dimensions, proportions, materials used and accessory parts, so long as these variations do not affect the really characteristic points of the said invention.

I claim—

1. In a cooling device for explosive engines, a cylinder and valve box having their bodies formed with a plurality of longitudinally extending conduits having spirally grooved bars therein, the conduits of the cylinder opening at their upper ends into the air and the conduits of the valve box opening at their lower ends into the air, a casing surrounding the cylinder and valve box and spaced therefrom, and an air forcing device arranged within the casing for forcing air through said conduits.

2. In a cooling device for explosive engines, a cylinder and valve box having their bodies formed with a plurality of longitudinally extending spiral conduits, the conduits of the cylinder opening at their upper ends into the air and the conduits of the valve box opening at their lower ends into the air, a casing surrounding the cylinder and valve box and spaced therefrom, and an air forcing apparatus in the casing for forcing air through the said conduits.

3. In a cooling device for explosive engines, a cylinder and valve box having their bodies formed with a plurality of longitudinally extending conduits, the conduits of the cylinder opening at upper ends into the air and the conduits of the valve box opening at their lower ends into the air, a casing surrounding the cylinder and valve box and spaced therefrom, and means for forcing air into the casing and through said conduits.

4. In a cooling device for explosive engines, a cylinder and valve box each provided with longitudinally extending conduits, one set of conduits opening into the air at the top and the other at the bottom, a casing surrounding the cylinder and valve box and spaced therefrom, and a blower in the casing for forcing air through the said conduits.

5. In a cooling device for explosive engines, a cylinder and valve box, each provided with a plurality of conduits having spirally grooved bars therein and opening at one end into the air, a casing surrounding the cylinder and valve box, and an air forcing device in the casing for forcing air through the conduits.

The foregoing specification of my system of refrigeration for explosion motors of all kinds signed by me this twenty-first day of April 1904.

GEORGES BRAUN.

Witnesses:
HANSON C. COXE,
MAURICE H. PIGNET.